(12) United States Patent
Dobler et al.

(10) Patent No.: US 7,293,535 B2
(45) Date of Patent: Nov. 13, 2007

(54) COOLING MODULE FOR THE ENGINE OF A MOTOR VEHICLE

(75) Inventors: Helmut Dobler, Hemmingen (DE); Markus Höglinger, Stuttgart (DE); Bruno Knauf, Stuttgart (DE); Wolfgang Kramer, Weinstadt (DE); Stefan Rogg, Stuttgart (DE)

(73) Assignee: BEHR GmbH & Co. KG, Stuttgart (DE)

( * ) Notice: Subject to any disclaimer, the term of this patent is extended or adjusted under 35 U.S.C. 154(b) by 0 days.

(21) Appl. No.: 10/520,937

(22) PCT Filed: Jul. 7, 2003

(86) PCT No.: PCT/EP03/07267

§ 371 (c)(1),
(2), (4) Date: Jan. 12, 2005

(87) PCT Pub. No.: WO2004/007229

PCT Pub. Date: Jan. 22, 2004

(65) Prior Publication Data

US 2005/0217840 A1   Oct. 6, 2005

(30) Foreign Application Priority Data

Jul. 12, 2002   (DE) .................... 102 31 834

(51) Int. Cl.
  *F01P 7/02*   (2006.01)
(52) U.S. Cl. ................. 123/41.12; 123/41.01; 123/41.44; 165/148

(58) Field of Classification Search ............. 123/41.12, 123/41.01, 41.08, 41.09, 41.44, 41.49, 41.46; 165/DIG. 304, 51, 148
See application file for complete search history.

(56) References Cited

U.S. PATENT DOCUMENTS

| | | | |
|---|---|---|---|
| 2,286,398 A | | 6/1942 | Young |
| 4,685,513 A | * | 8/1987 | Longhouse et al. ......... 165/121 |
| 5,660,149 A | * | 8/1997 | Lakerdas et al. ......... 123/41.44 |
| 5,806,479 A | * | 9/1998 | Bauer et al. ......... 123/142.5 R |
| 5,845,612 A | * | 12/1998 | Lakerdas et al. ......... 123/41.44 |
| 5,970,925 A | * | 10/1999 | Lakerdas et al. ......... 123/41.11 |
| 6,016,774 A | | 1/2000 | Bokkers et al. |
| 6,684,937 B2 | | 2/2004 | Lenz et al. |

FOREIGN PATENT DOCUMENTS

| | | |
|---|---|---|
| DE | 195 34 108 A1 | 3/1997 |
| EP | 1 201 889 A1 | 5/2002 |
| EP | 1 213 554 A2 | 6/2002 |
| WO | WO 97/23713 A1 | 7/1997 |

\* cited by examiner

*Primary Examiner*—Stephen K. Cronin
*Assistant Examiner*—Katrina B. Harris
(74) *Attorney, Agent, or Firm*—Foley & Lardner LLP

(57) ABSTRACT

The invention relates to a cooling module for an engine (1) of a motor vehicle. Said cooling module comprises a heat exchanger (4), at least one fan (16) and a coolant pump (8), whereby a modular frame (3) forms an integral part of the cooling module (2) and the coolant pump (8) is disposed within and/or on said modular frame.

19 Claims, 4 Drawing Sheets

COOLING MODULE FOR THE ENGINE OF A MOTOR VEHICLE

BACKGROUND OF THE INVENTION

The invention relates to a cooling module for the engine of a motor vehicle in DE 195 34 108 A1 discloses a radiator for a cooling-water circuit of a motor vehicle engine, the cooling-water circuit being driven by an electric-motor centrifugal pump which is arranged entirely or partially within the radiator or such that it is directly adjacent to the radiator.

Furthermore, WO97/23713 discloses a cooling arrangement having a heat exchanger module, a fan module, a cooling-pump module, and an electronic system control module, the individual modules being connected to one another. The fan module is arranged directly behind the rear side of the radiator and comprises an electrically driven cooling fan which conducts ambient air across the radiator. The cooling-pump module, which pumps engine cooling water through the engine and the radiator, and the electronic system control module, which controls the operation of the cooling fan and of the pump motor, are likewise fixed on the fan module.

SUMMARY OF THE INVENTION

It is the object of the invention to provide an improved cooling module.

The invention provides a cooling module, i.e. a cooling arrangement for the engine of a motor vehicle, a module frame being part of the cooling module within which and/or on which the coolant pump is arranged. In this case, further components, for example, heat exchangers, lines of the coolant circuit, sensors, valves, control modules, are also fixed on the module frame next to the coolant pump. The compact modular construction permits a more rapid installation or removal in the event of a service. It is also not necessary to reinforce other components of the cooling module; on the contrary, the module frame is of appropriate dimensions. The module frame is preferably a supporting component of the cooling module. In this case, force is transmitted directly via the module frame to the vehicle body.

The cooling module preferably has a valve which is connected to the coolant pump as a constructional unit. This permits a compact construction and simplifies and accelerates the installation. The valve regulates the coolant throughput via the heat exchanger as a function of the coolant temperature.

The cooling module preferably has a sensor for regulating the coolant temperature, the sensor being integrated into the cooling module and monitoring the temperature of the coolant circuit. In this case, the sensor may be fixed on a valve or integrated into the same. As an alternative, the sensor may be arranged in a line between the valve and the coolant pump, provided on the coolant pump or integrated into the same or may be arranged in a line between the coolant pump and the internal combustion engine.

The cooling module preferably has a control module for controlling the coolant pump, the valve position and/or the fan. In this case, the control module is connected to an external control module, i.e. a control module outside the module frame, preferably via an interface.

The connection of the coolant pump is preferably arranged approximately in the center of one side of the module frame. This permits an optimum transmission of force and further conduction of force in the module housing. The arrangement of the coolant pump may also be eccentric, above or below the cooling module. The selection of the coolant pump arrangement depends in particular on the construction space situation.

The coolant pump and/or the valve is/are preferably aligned parallel to the region of the module frame, in which it and/or they is/are fixed. This enables an optimum fastening in transmission of force to the module frame.

The connection is preferably provided for that part of the coolant circuit through which the flow passes parallel to the heat exchanger, which connection is aligned in the axial direction of the coolant pump. This permits an optimum approach of the flow to the coolant pump.

A flexible connecting means, for example in the form of an elastic hose, is preferably arranged between the outlet of the heat exchanger and the inlet of the coolant pump. This simplifies the installation and reduces tolerance problems.

The coolant pump is preferably arranged on the module frame in such a manner that the cooling air can flow around and therefore cool the electronics of the coolant pump. In this case, the supply of cooling air to the coolant pump electronics can preferably take place by means of a branching of the cooling air out of the cooling-fan housing, by means of branching the cooling air behind the cooling-fan housing or conducting the cooling air from the approach-flow side of the cooling module through an opening or conducting air in the module frame to the coolant pump.

The module frame and a cooling-fan housing preferably forms a constructional unit.

A bypass is preferably formed in an integrated manner in the cooling module. This reduces the number of connections to the cooling module.

BRIEF DESCRIPTION OF THE DRAWINGS

The invention will be explained in detail below using two exemplary embodiments and with reference to the drawing, in which.

DETAILED DESCRIPTION OF PREFERRED EMBODIMENTS

Figure 1:
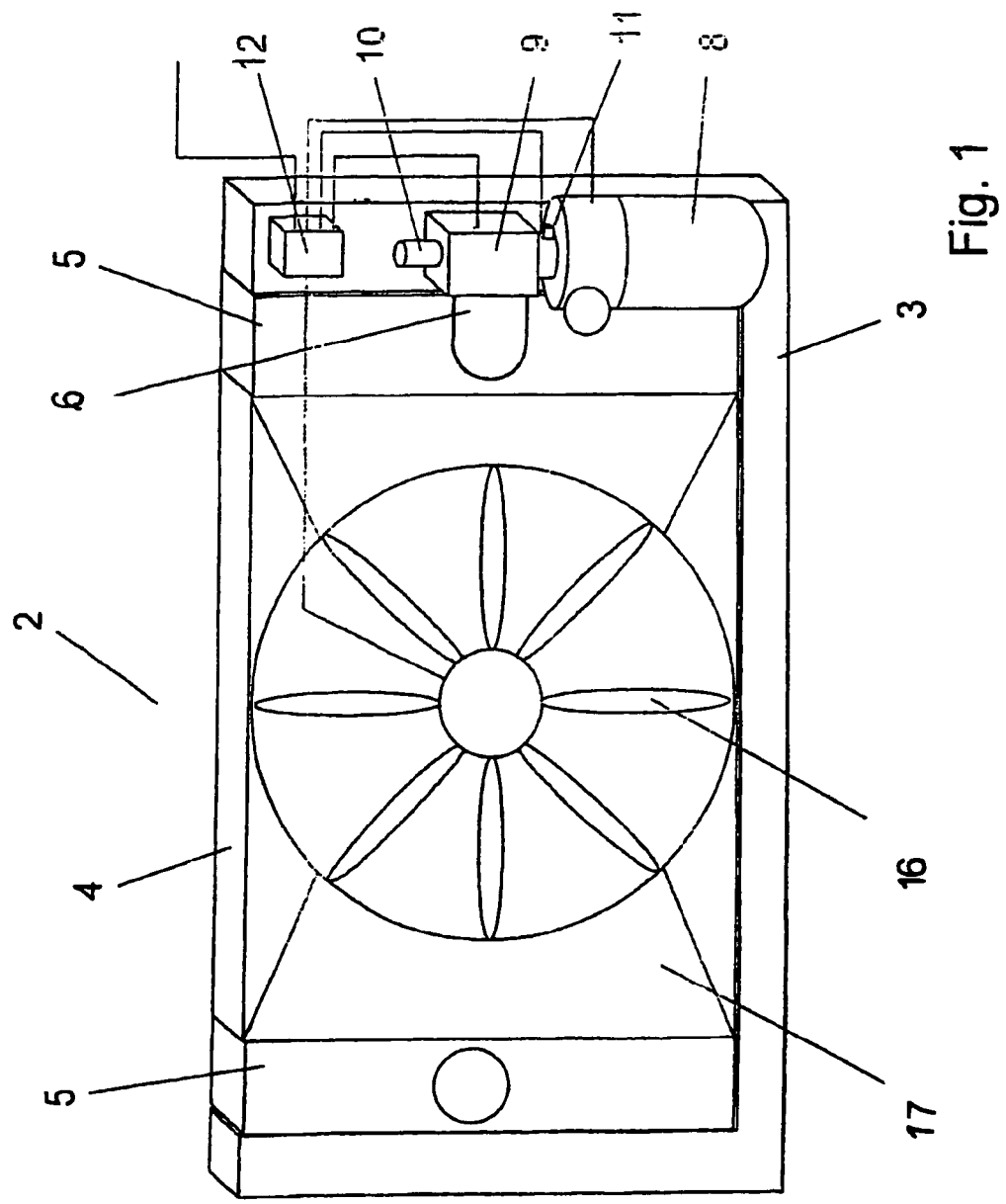
FIG. 1 shows a simplified view of the first exemplary embodiment of a cooling module according to the invention without an integrated bypass.

An internal combustion engine 1 of a motor vehicle has a cooling module 2 which is arranged essentially in and/or on a module frame 3. Part of the cooling module 2 is at least one heat exchanger 4 (radiator), which is provided in the module frame 3 and is fastened thereto and has two collecting containers 5, of which one of the collecting containers 5 serves as the forward-flow collector and the other as a the return-flow collector.

The heat exchanger 4 together with collecting containers 5 is part of an engine coolant circuit 6 through which a coolant, driven by an electric coolant pump 8, flows. Provided in the coolant circuit 6, downstream of the heat exchanger 4 of the collecting container 5, is a valve 9 which is connected via a connection 10 to one of the collecting containers 5 of the heat exchanger 4. According to the present exemplary embodiment, in the case of the valve 9 here a second connection 10' is provided for a bypass 18 by means of which the coolant can be fed past the heat exchanger 4 and directly to the coolant pump 8. The bypass 18 may also be integrated into the cooling module or into the module frame. This measure enables the number of connections on the cooling module to be reduced.

Figure 3:
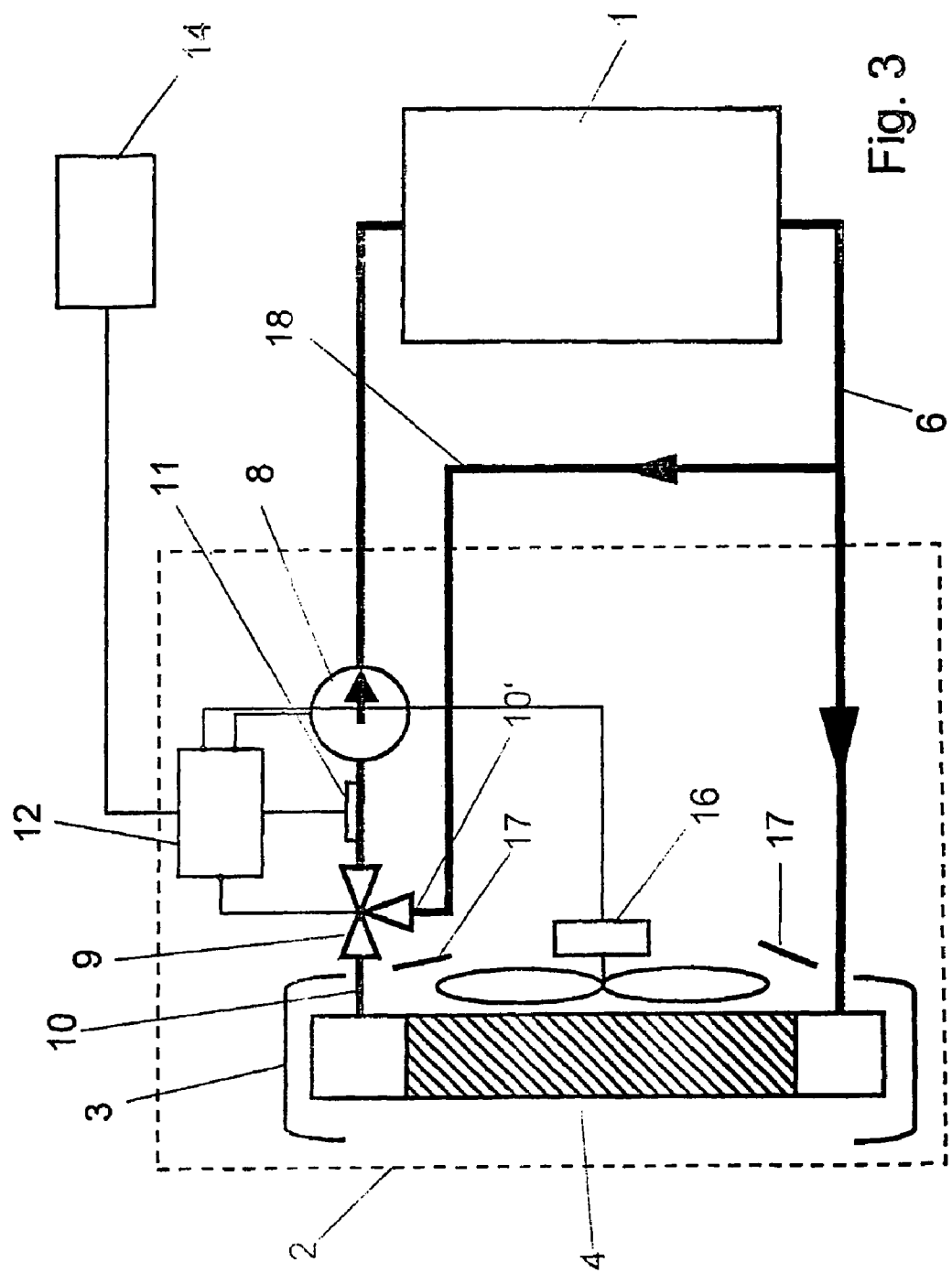
FIG. 3 shows a schematic illustration of the cooling module including the cooling-water circuit according to the first exemplary embodiment.

The valve 9 may be arranged both downstream of the heat exchanger 4, i.e. fixed on its outlet side, as illustrated in the figures, and also, according to an alternative embodiment, on its inlet side. The same also applies for the coolant pump 8. The latter may be situated downstream of the outlet of the heat exchanger 4 (intake side—cf. FIGS. 3 and 4) or, according to an alternative arrangement may be arranged upstream of the inlet of the heat exchanger 4 (delivery side).

According to the first exemplary embodiment, the connection 10' is arranged in the axial direction with respect to the coolant pump 8. The valve 9 is regulated with the aid of a control module 12 as a function of the measuring results of a sensor 11, the control module 12, for its part, being connected to an external control module 14. The control module 12 furthermore regulates the coolant pump 8 and a fan 16 with a cooling-fan wheel, which is arranged adjacent to the heat exchanger 4. The fan 16 is fixed on fan housings 17 which are arranged within the module frame 3.

According to one variant, the valve 9 may also be a regulator which is dependent only on the coolant temperature and not on the control module 12, for example an expansion-element thermostat. The control module 12 then only regulates the coolant pump 8 and the fan 16.

According to the first exemplary embodiment, the coolant pump 8 is fixed approximately centrally directly adjacent to the module frame 3 on one side of the same, the module frame 3 being the supporting component of the cooling module 2 and force being transmitted directly via the module frame 3 to the vehicle body (not illustrated). However, the coolant pump may also be arranged eccentrically and above or below the cooling module.

For the installation process, first of all a preassembly takes place, in which components of the cooling module 2 that are connected to the module frame 3 are fastened to the module frame 3. Only within the context of the actual installation is the preassembled cooling module 2 inserted into the vehicle body and fastened therein.

Figure 2:
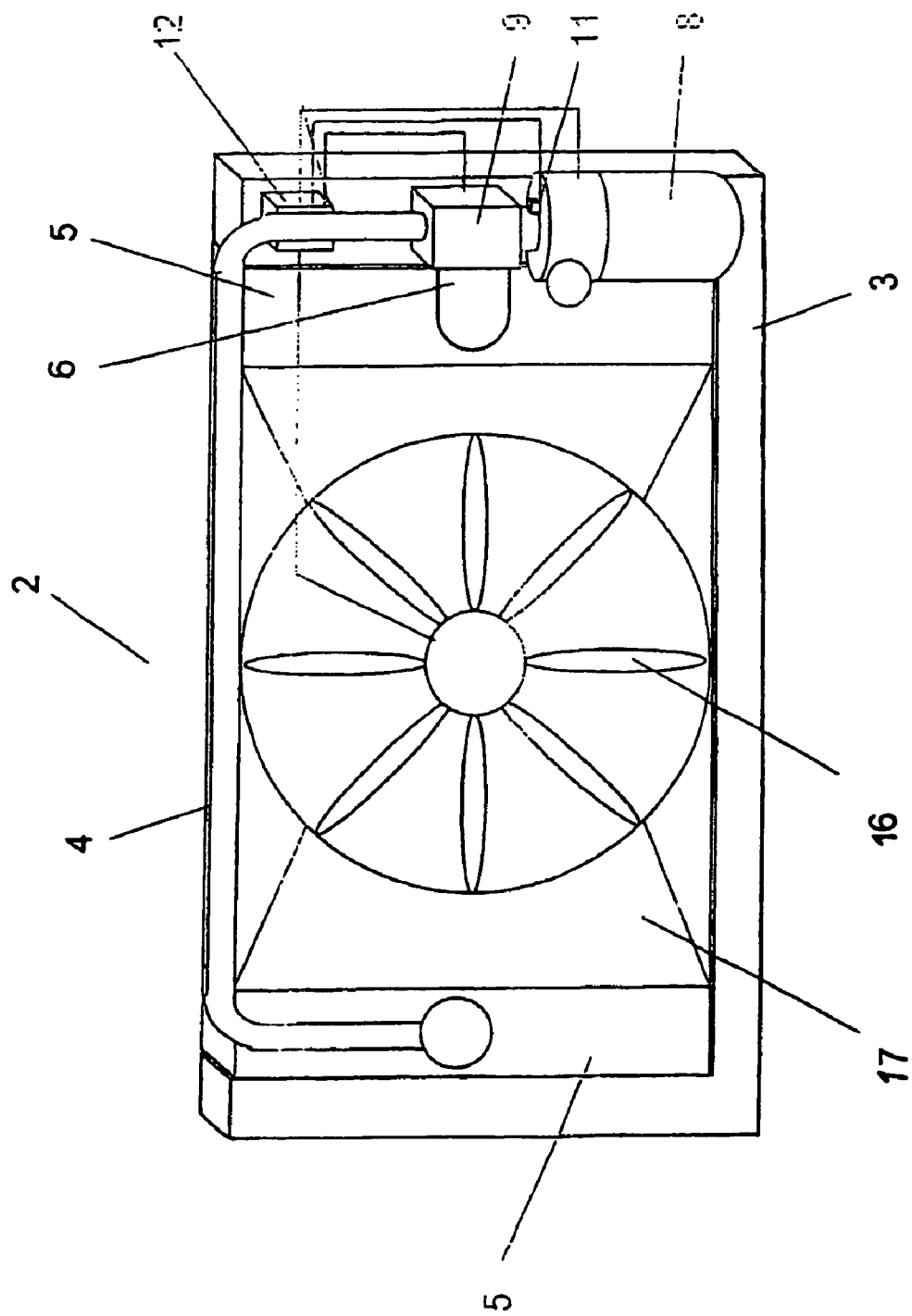
FIG. 2 shows a simplified view of the second exemplary embodiment of a cooling module according to the invention with an integrated bypass.
Figure 4:
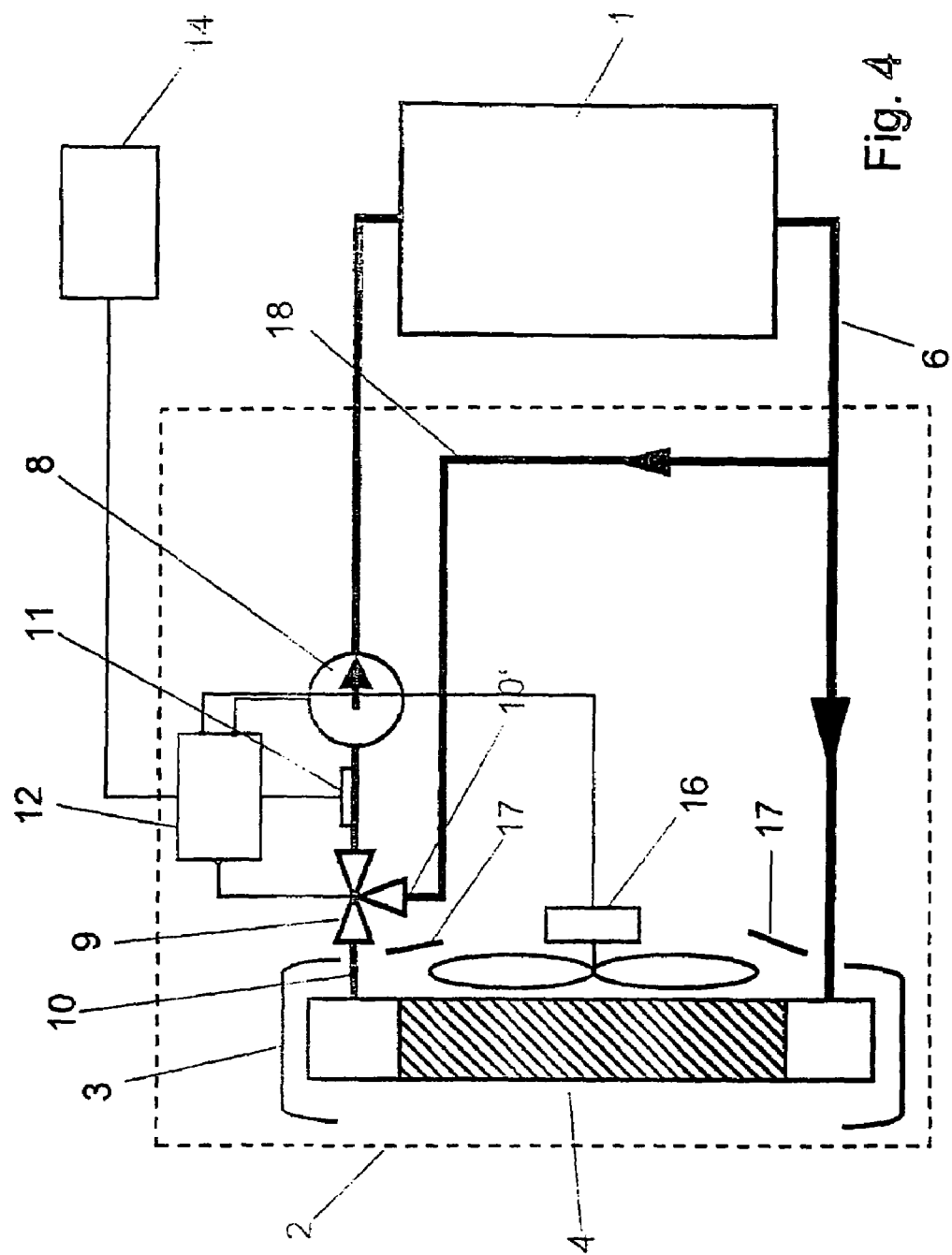
FIG. 4 shows a schematic illustration of the cooling module including the cooling-water circuit according to the second exemplary embodiment.

According to the second exemplary embodiment, which is illustrated in FIGS. 2 and 4 and in which the same reference numbers are used, the bypass 18 is formed in an integrated manner. Otherwise, the second exemplary embodiment corresponds to the previously described first exemplary embodiment.

The invention claimed is:

1. A cooling module for the engine of a motor vehicle, comprising: a generally planar principal heat exchanger for air-cooling engine coolant, said heat exchanger having a front side, a rear side, right and left lateral sides, a bottom side and a top side and being designed for essentially vertical mounting in the vehicle at least one fan mounted for directing air from the front side to the rear side through the principal heat exchanger; a coolant circuit portion comprising coolant pump for pumping engine coolant through the principal heat exchanger; and a module frame which laterally surrounds at least a portion of the heat exchanger including at least one of said lateral side of the principal heat exchanger and to which the principal heat exchanger is connected, wherein the coolant pump is mounted on said module frame and is arranged in such a way as to be positioned laterally beside one of said lateral sides of the principal heat exchanger.

2. The cooling module as claimed in claim 1, wherein the module frame is a supporting component of the cooling module.

3. The cooling module as claimed in claim 1, wherein the cooling module further comprises a valve operatively connected to the coolant pump.

4. The cooling module as claimed in claim 3, wherein the valve is connected to the coolant pump as a constructional unit.

5. The cooling module as claimed in claim 1, wherein the cooling module further comprises a sensor for regulating the coolant temperature, which sensor is integrated into the cooling module.

6. The cooling module as claimed in claim 1, wherein the cooling module further comprises a control module for regulating the coolant pump.

7. The cooling module as claimed in claim 6, further comprising an external control module associated with the vehicle, wherein the control module is connected to said external control module via an interface.

8. The cooling module as claimed in claim 1, wherein the coolant pump is arranged approximately in the center of one side of the module frame.

9. The cooling module as claimed in claim 1, wherein at least one of the components consisting of the coolant pump and the valve is aligned parallel to the region of the module frame to which the respective component is fixed.

10. The cooling module as claimed in claim 1, wherein a connection is provided for that part of the coolant circuit through which the flow passes parallel to the heat exchanger, which connection is aligned in the axial direction of the coolant pump.

11. The cooling module as claimed in claim 1, further comprising a flexible connecting means arranged between the coolant outlet of the heat exchanger and the inlet of the coolant pump.

12. A cooling module as claimed in claim 1,
wherein the coolant pump is arranged on the module frame in such a manner that cooling air can flow around the electronics of the coolant pump.

13. The cooling module as claimed in claim 1, further comprising a cooling-fan housing, wherein the module frame and the cooling-fan housing form a constructional unit.

14. The cooling module as claimed in claim 1, further comprising a coolant bypass in the coolant circuit, wherein a bypass is formed in an integrated manner.

15. A cooling module for the engine of a motor vehicle as claimed in claim 1,
wherein the fan includes a fan housing and wherein the fan housing and the module frame are separate structural elements.

16. A cooling module for the engine of a motor vehicle as claimed in claim 1,
wherein the pump is positioned toward the rear side of the module frame, in the direction of air flow.

17. A cooling module for the engine of a motor vehicle as claimed in claim 1, wherein the module frame surrounds both lateral sides of the principal heat exchanger, and the coolant pump is connected to the module frame at one of said lateral sides.

18. A cooling module for the engine of a motor vehicle as claimed in claim 17, wherein the module frame surrounds three sides of the principal heat exchanger.

19. A cooling module for the engine of a motor vehicle as claimed in claim 18, wherein the module frame is a continuous structure.

* * * * *